United States Patent [19]

Sato

[11] Patent Number: 5,333,812
[45] Date of Patent: Aug. 2, 1994

[54] CLUTCH STRUCTURE FOR A FISHING REEL

[75] Inventor: Jun Sato, Sakai, Japan

[73] Assignee: Shimano Inc., Osaka, Japan

[21] Appl. No.: 889,286

[22] Filed: May 28, 1992

[30] Foreign Application Priority Data

Jun. 7, 1991 [JP] Japan .................. 3-042615[U]
Dec. 17, 1991 [JP] Japan ................. 3-103876[U]

[51] Int. Cl.⁵ .............................................. A01K 89/033
[52] U.S. Cl. ..................................................... 242/261
[58] Field of Search ........................ 242/259–262, 242/321

[56] References Cited

U.S. PATENT DOCUMENTS

| | | | |
|---|---|---|---|
| 4,014,422 | 3/1977 | Morishita | 242/261 |
| 4,222,537 | 9/1980 | Noda | 242/261 |
| 4,379,530 | 4/1983 | Kobayashi | 242/261 |
| 4,406,427 | 9/1983 | Murakami | 242/261 |
| 4,709,874 | 12/1987 | Murakami | 242/261 |
| 4,824,046 | 4/1989 | Emura et al. | 242/261 |
| 5,058,823 | 10/1991 | Emura et al. | 242/261 |

FOREIGN PATENT DOCUMENTS

60-62933  4/1985 Japan .
62-164773 10/1987 Japan .

*Primary Examiner*—Daniel P. Stodola
*Assistant Examiner*—Michael R. Mansen
*Attorney, Agent, or Firm*—Dickstein, Shapiro & Morin

[57] ABSTRACT

A clutch structure for a fishing reel includes a clutch sleeve mounted on a spool shaft to be movable axially thereof between an operative position to engage the spool shaft for unitary rotation therewith and an inoperative position to rotate relative to the spool shaft, and a shift yoke and a rotary cam for switching the clutch sleeve between the operative position and inoperative position. An annular boss projects from an inside wall of a reel body for supporting the rotary cam. An annular smoothing support member is fitted between the boss and cam.

2 Claims, 9 Drawing Sheets

CLUTCH STRUCTURE FOR A FISHING REEL

BACKGROUND OF THE INVENTION

1. Field of the Invention

This invention relates to a clutch structure for a fishing reel, and more particularly to a clutch structure having a transmission shaft for transmitting drive from a handle to a spool, a clutch member mounted on the transmission shaft to be movable axially thereof between an operative position to engage the transmission shaft for unitary rotation therewith and an inoperative position to rotate relative to the transmission shaft, and a rotary cam operable through a yoke to switch the clutch member between the operative position and inoperative position.

2. Description of the Related Art

Known examples of clutch structures as described above are disclosed in Japanese Utility Publication Kokai Nos. 1985-62933 and 1987-164773. In the former, a cam is mounted on an annular boss formed in a reel body. When a clutch mechanism is operated, the cam is rotated in sliding contact with an outer periphery of the boss. In the latter, a cam is disposed in a circular opening formed in a reel body. When a clutch mechanism is operated, the cam is rotated in sliding contact with an inner periphery of the opening.

In the prior art, as noted above, the rotary cam is rotatably supported by a support portion formed integral with the reel body. Compared with the case of a support portion formed separately from the reel body, the above-noted structures have the advantage that the cam is rotatable steadily without requiring adjustment of a rotational axis of the cam. In conventional practice, the reel body is manufactured by shaping a plastic with dies or by die-casting a metal. Thus, a material having excellent workability is selected for forming the reel body. However, little consideration is made of frictional coefficient and wear resistance. This tends to result in a heavy clutch operation and, after a long period of use, the clutch becomes incapable of smooth operation due to wear. Thus, improvement is desired.

The clutch mechanism is operated frequently in the case of a baitcasting reel in which casting and reeling are repeated. In this type of reel, it is particularly important to maintain the clutch mechanism in a lightly and smoothly operable condition over a long period.

SUMMARY OF THE INVENTION

The object of the present invention is to provide an improved clutch mechanism operable lightly and smoothly over a long period while retaining the above-noted advantage that the cam is rotatable steadily without requiring adjustment of a rotational axis of the cam.

A clutch structure is provided, according to the present invention, for a fishing reel having a clutch member mounted on a transmission shaft to be movable axially thereof between an operative position to engage the transmission shaft for unitary rotation therewith and an inoperative position to rotate relative to the transmission shaft, a rotary cam operable through a yoke to switch the clutch member between the operative position and inoperative position, as noted in the outset hereof. This clutch structure includes a support portion formed integral with a reel body for rotatably supporting the rotary cam, and a smoothing support member disposed between the support portion and cam.

The above construction has the following functions and effects.

Figure 1:
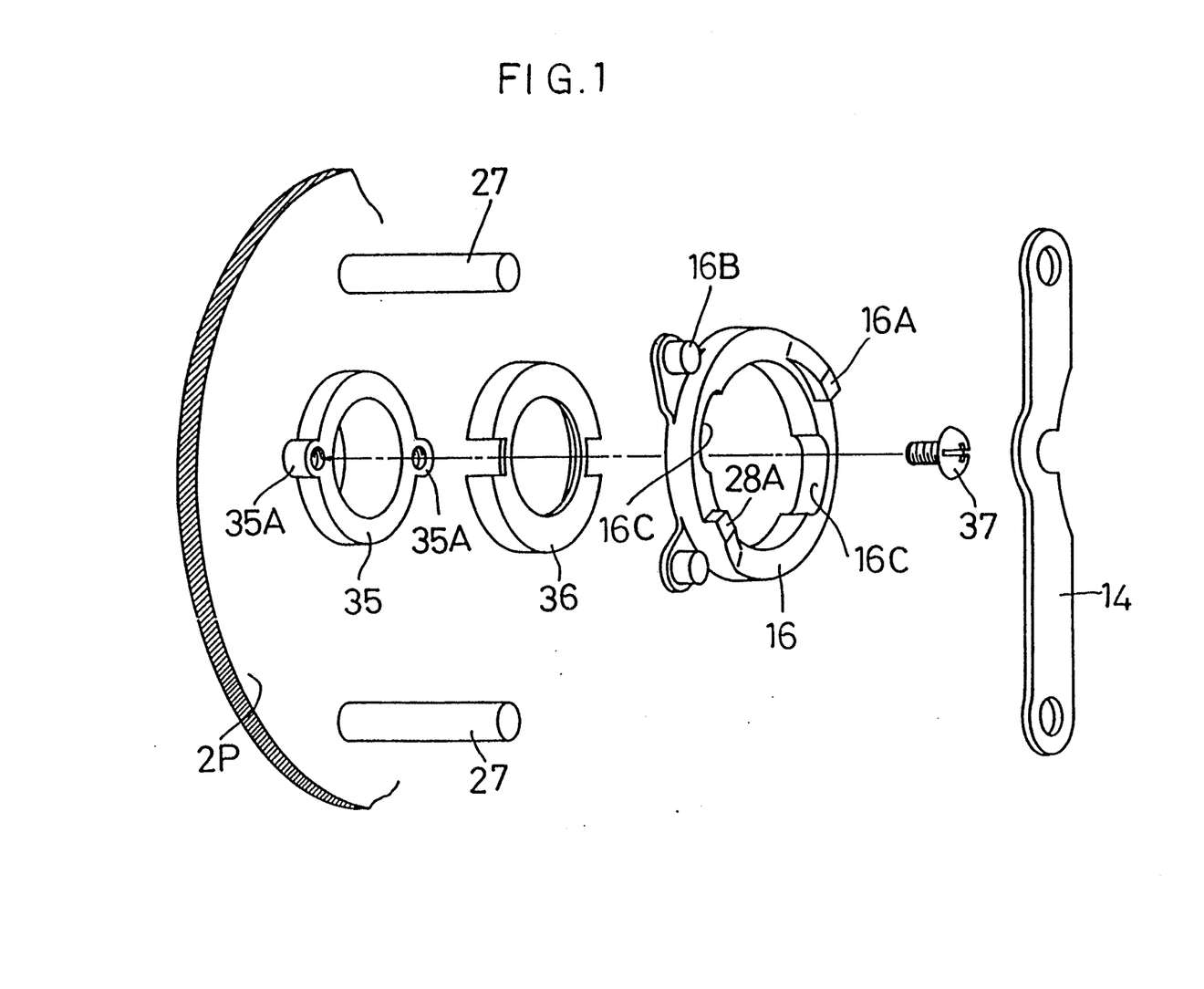
FIG. 1 is an exploded perspective view of a clutch operating system in a clutch engaging state.
Figure 2:
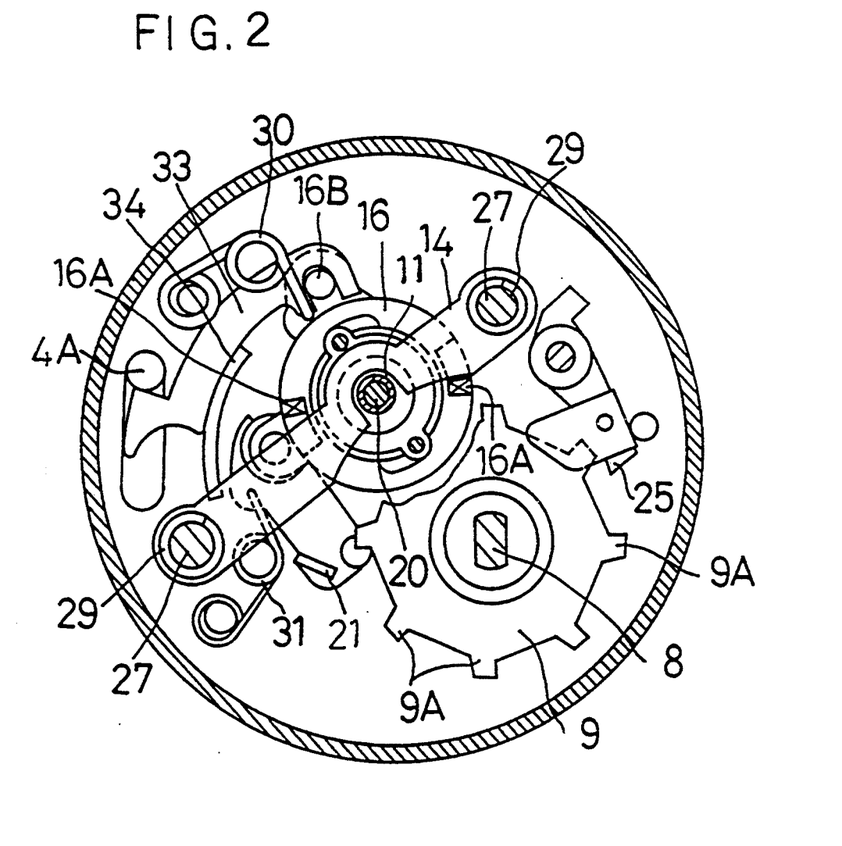
FIG. 2 is a side view of the clutch operating system.
Figure 3:
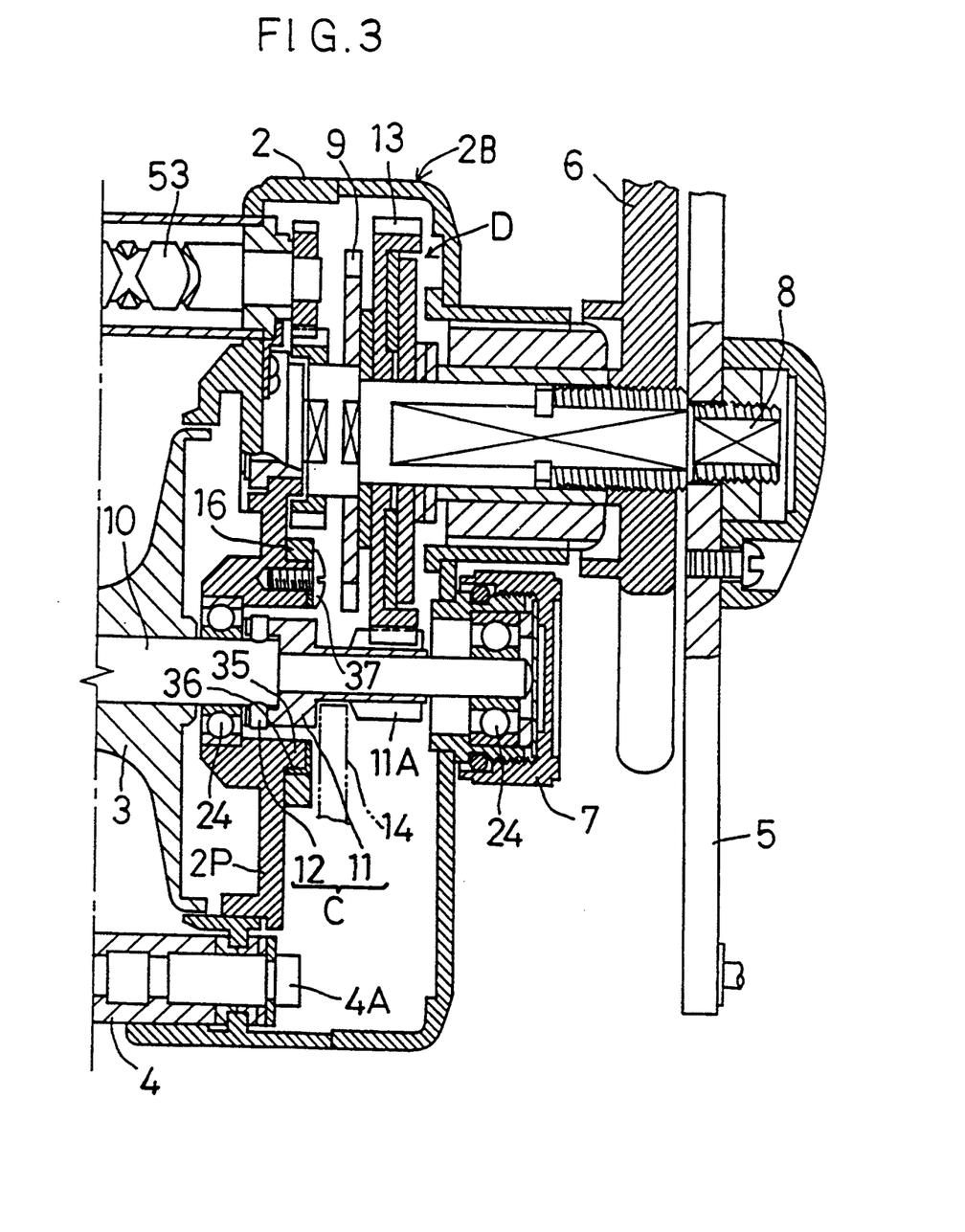
FIG. 3 is a sectional view of a right half of a fishing reel.

The above features may be embodied as shown in FIGS. 1 through 3, for example. When a clutch mechanism C is operated, a cam 16 rotates in contact with a smoothing support 36 to switch a clutch member 11 through a yoke 14. The smoothing support 36 is formed of a material having a low coefficient of friction or excellent wear resistance to allow the cam 16 to rotate lightly. Further, wear is reduced despite repeated operations of the clutch mechanism C.

According to the present invention, the annular support portion or boss 35 is formed integral with the reel body but does not directly support the cam 16. The smoothing support 36 is mounted between the support portion 35 and cam 16. This allows the reel body to be formed of a material having excellent workability. Further, it is possible to improve durability of the clutch operating system and to reduce resistance to operation of the clutch mechanism C without changing the material for forming the reel body. Compared with the case of a support portion formed separately from the reel body, the construction according to the present invention has the advantage that the cam is rotatable steadily without requiring adjustment of a rotational axis of the cam.

Thus, the invention provides an improved clutch mechanism operable lightly and smoothly over a long period while retaining the advantage that the cam is rotatable steadily without requiring adjustment of the rotational axis of the cam.

Other features and advantages of the present invention will be understood from the following description taken with reference to the accompanying drawings.

DETAILED DESCRIPTION OF THE PREFERRED EMBODIMENTS

A clutch structure for a fishing reel according to the present invention will be described in detail hereinafter with reference to the drawings.

Figure 4:
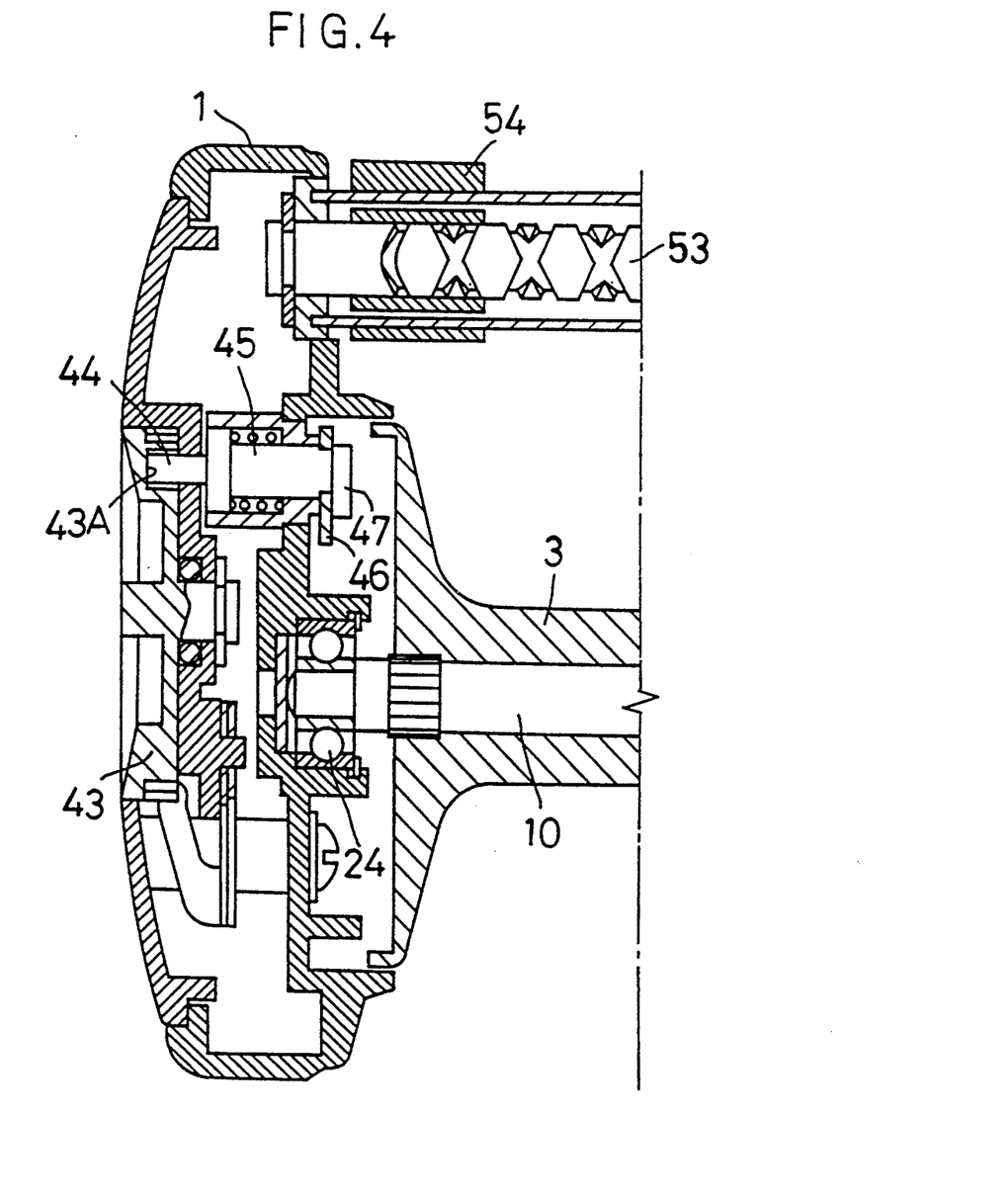
FIG. 4 is a sectional view of a left half of the fishing reel.
Figure 5:
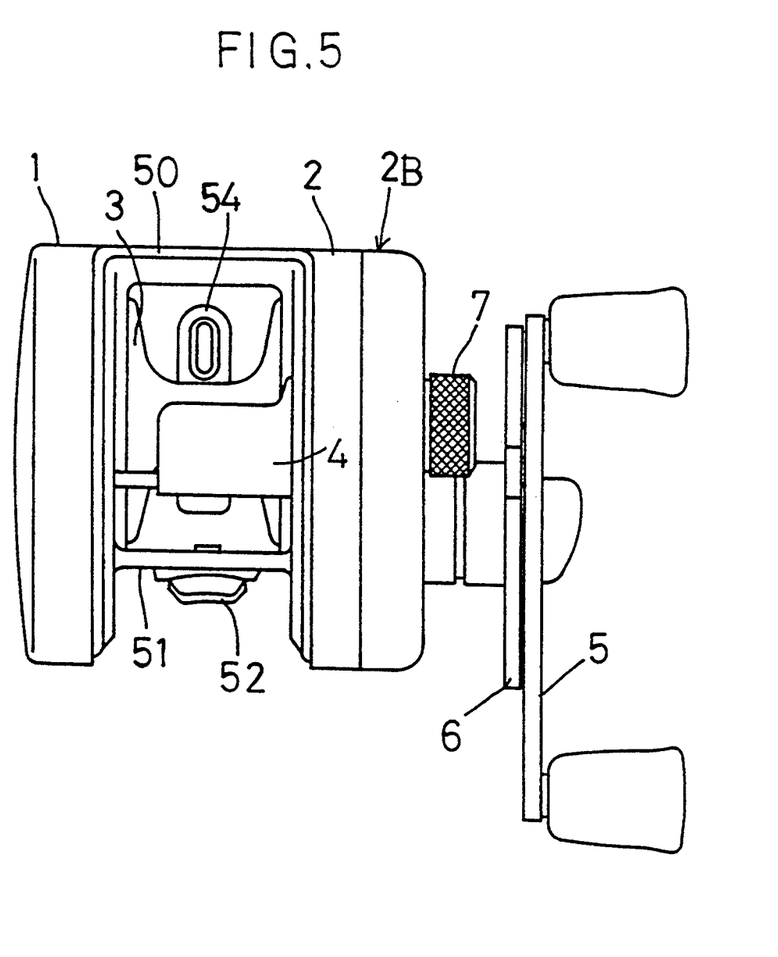
FIG. 5 is a rear view of the fishing reel.

FIGS. 3 through 5 show a baitcasting reel in one embodiment of the invention. The reel comprises a left case 1 and a right case 2 constituting a reel body, and a level wind mechanism mounted in a front position between the two cases 1 and 2. The level wind mechanism includes a screw shaft 53, and a line guide 54 reciprocable right and left with rotation of the screw shaft 53.

Further, the reel body has a spool 3 mounted centrally thereof and a clutch controller 4 mounted in a rear position. The right case 2 supports a handle 5, a drag controller 6, and a cast controller 7.

In this reel, parts of the left case 1 and right case 2, and an upper thumb rest 50 and a pair of lower frames 51 are formed into an integral unit by aluminum die casting. To form the reel body, a cover 2B is disposed to extend over an outer side of the right case 2. A mounting foot 52 extends between the pair lower frames 51 to be secured to a fishing rod.

As shown in FIG. 4, the left case 1 contains a brake mechanism including a pin 44 engaged with a cam groove 43A formed in an inside surface of a dial 43, a rod 45, a plate 46 and a magnet 47 interlocked to one another. The brake mechanism is operable by the dial 43 to vary a distance between the magnet 47 and a metallic side wall of the spool 3, thereby adjusting a braking, force based on eddy currents generated on the spool 3.

As shown in FIG. 3, the handle 5 and drag controller 6 are mounted on a handle shaft 8 extending from the right case 2. The handle shaft 8 supports a drag mechanism D and a ratchet wheel 9 mounted on an inward end portion thereof. A spool shaft 10 (one example of transmission shaft) rotatable with the spool 3 supports a clutch sleeve 11 (one example of clutch member) slidably mounted thereon and a pin 12 fixed to the spool shaft 10 to be engageable with the clutch sleeve 11. The clutch sleeve 11 and pin 12 constitute a clutch mechanism C. The clutch sleeve 11 has an input gear 11A meshed with an output gear 13 of the drag mechanism D, whereby torque from the handle 5 is transmitted to the spool 3 through the drag mechanism D and clutch mechanism C.

The spool shaft 10 is supported at opposite ends thereof by bearings 24. The cast controller 7 is screwed to the right case 2 for adjusting a frictional force applied to the righthand end of the spool shaft 10. The ratchet wheel 9 has teeth 9A engageable with a ratchet pawl 25 to prevent backward turning of the handle 5.

As shown in FIGS. 1 and 2, the clutch sleeve 11 is engaged with a yoke 14 slidably supported on a pair of support shafts 27. A rotary cam 16 is rotatably mounted coaxially with the axis of the spool 3. This rotary cam 16 defines a pair of cam surfaces 16A for operating the clutch sleeve 11 through the yoke 14. The rotary cam 16 has an engaging pin 16B engaged with a link element 33 operable through contact with a control pin 4A of the clutch controller 4.

Compression springs 29 are mounted on the support shafts 27 to urge the yoke 14 to a position to engage the clutch mechanism C. A toggle spring 30 acts on the rotary cam 16 to maintain the rotary cam 16 in the position to engage or a position to disengage the clutch mechanism C. A further toggle spring 31 acts on a return arm 21 to switch the arm 21 to a position in which an end thereof interferes with the ratchet wheel 9 when the clutch mechanism C is set to the disengaged position.

When disengaging the clutch mechanism C, the clutch controller 4 is depressed to place the link element 33 into contact with a guide 34. Then the link element 33 moves describing an arcuate locus while in contact with the guide 34, to rotate the rotary cam 16. As a result, the clutch sleeve 11, through pressure contact with the cam surfaces 16A, disengages from the pin 12 fixed to the spool shaft 10. When engaging the clutch mechanism C, the handle 5 is turned in a direction to take up the fishing line. This causes a tooth 9A of the ratchet wheel 9 to push the return arm 21, whereby the rotary cam 16 is returned. Consequently, the yoke 14 moves under the urging force of compression springs 29 to the position to engage the clutch mechanism C.

The right case 2 includes a plate 2P defining an opening through which the spool shaft 10 extends. The plate 2P has an annular support portion or boss 35 formed peripherally of the opening and projecting away from the spool 3. The support portion 35 has, securely mounted thereon, an annular smoothing support 36 formed of a plastic material having a low coefficient of friction and excellent wear resistance. The cam 16 is rotatably supported on an outer surface of the smoothing support 36. Thus, the smoothing support 36 is disposed between the support portion 35 and cam 16. When the clutch mechanism C is operated, the smoothing support 36 allows the cam 16 to move lightly and smoothly.

The support portion 35 includes stoppers 35A opposed to each other across the spool shaft 10. The cam 16 defines cutouts 16C for contacting the stoppers 35A to limit an amount of rotation of the cam 16. The stoppers 35A have screws 37 extending therefrom to retain the cam 16 in position.

Instead of the support portion 35 in the above embodiment, the plate may define a circular opening through which the spool shaft extends, and the cam may be supported by an inner peripheral wall of this opening. That is, a smoothing support is formed on the inner peripheral wall of the opening, and the cam is placed in contact with an inner peripheral wall of the smoothing support.

Further, according to the present invention, the reel body may be formed of plastic. The smoothing support may be formed by coating a metallic material with a plastic material having a low coefficient of friction. The invention is also applicable to reels other than baitcasting reels.

FIGS. 6 through 9 show a clutch structure for a fishing reel in a further embodiment of the invention. This embodiment includes an approximately tubular yoke 14' and an approximately tubular support portion 15. An engaging recess 14'A fits over an entire width of the support portion 15. The yoke 14' is supported by a reel body through the engaging recess 14'A and support portion 15 to be slidable axially of a transmission shaft of a spool driving system. One of the support portion 15 and engaging recess 14'A is formed on/in one of the reel body and yoke 14', and the other of the support portion 15 and engaging recess 14'A is formed on/in the other of the reel body and yoke 14'. A drive mechanism B is provided to slide the yoke 14'.

The above construction advantageously has the following function and effect.

The yoke is supported through the approximately tubular support portion and the engaging recess, such that the yoke is supported through a substantially entire width of the support portion. Thus, the support portion may have a reduced wall thickness. Because of the tubular shape, the support portion and yoke may be arranged coaxially with other components about the axis of the transmission shaft. The support portion may be disposed in a position close to the axis of the transmission shaft where a space for accommodating a support shaft is difficult to find. The support portion disposed close to the axis of the transmission shaft allows the yoke to be formed compact, compared with the prior art in which the yoke must extend a great deal rightward and leftward under a limitation imposed by the position occupied by the support shaft.

Thus, compared with the prior art, the space occupied by the yoke is diminished by the simple modification employing the tubular support portion for supporting the yoke which is formed tubular also. This construction contributes toward compactness of the fishing reel and an increased freedom for design choice.

This embodiment will be described in greater detail hereinafter.

FIGS. 6 through 9 show a baitcasting reel according to this embodiment. The reel comprises a left case 1 and a right case 2 constituting a reel body, a spool 3 mounted centrally of the reel body, and a clutch controller 4 mounted in a rear position. The right case 2 supports a handle 5 for taking up a fishing line, a drag controller 6, and a cast controller 7.

Figure 6:
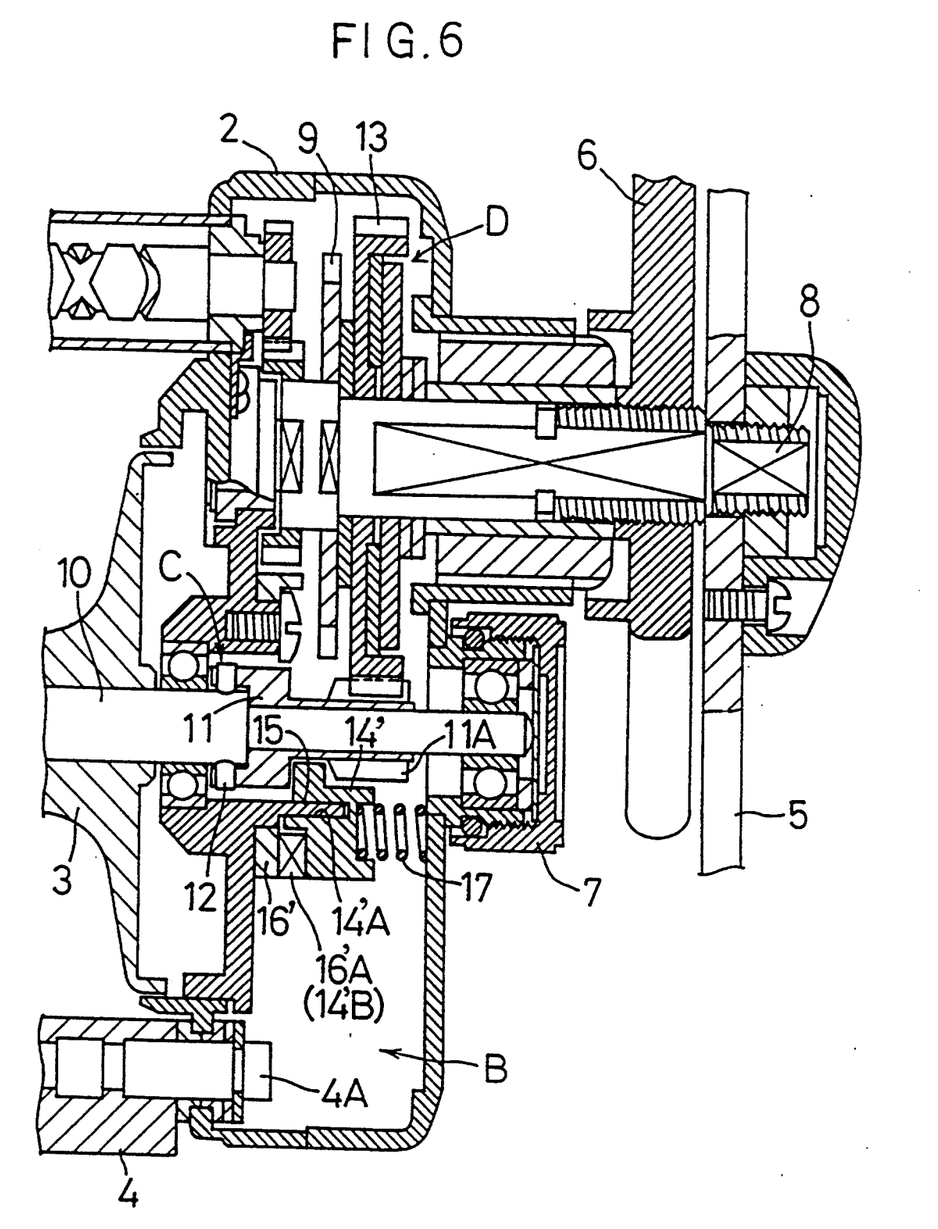
FIG. 6 is a side view in vertical section showing an interior structure of a right case in a further embodiment.

As shown in FIG. 6, the handle 5 and drag controller 6 are mounted on a handle shaft 8 extending from the right case 2. The handle shaft 8 supports a drag mechanism D and a ratchet wheel 9 mounted on an inward end portion thereof. A spool shaft 10 acts as a transmission shaft of a spool driving system rotatable with the spool 3. A clutch mechanism C includes a clutch sleeve 11 slidably mounted on the spool shaft 10, and a pin 12 fixed to the spool shaft 10 to be engageable with the clutch sleeve 11. The clutch sleeve 11 has an input gear 11A meshed with an output gear 13 of the drag mechanism D, whereby torque from the handle 5 is transmitted to the spool 3 through the drag mechanism D and clutch mechanism C.

Figure 8:
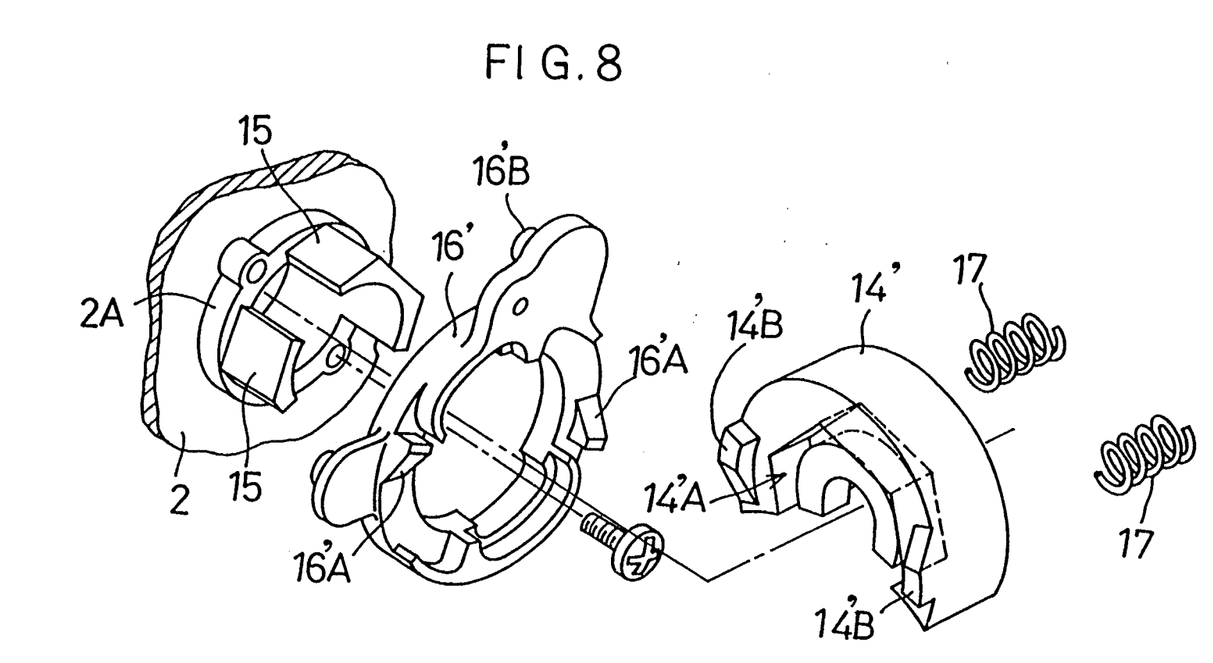
FIG. 8 is an exploded perspective view showing a support, a rotary cam and a clutch yoke.
Figure 9:
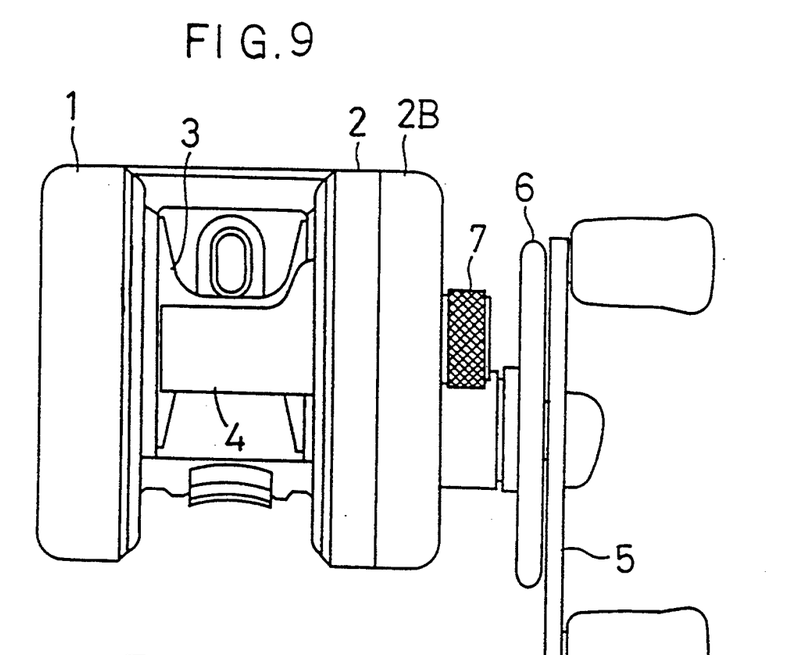
FIG. 9 is a rear view of a fishing reel in the further embodiment.

As shown in FIGS. 6 and 8, the clutch sleeve 11 is engaged with a yoke 14' to be slidable back and forth axially of the spool shaft 10. The right case 2 includes a support portion 15 projecting from an inner wall thereof toward the yoke 14'. A circular mounting seat 2A is formed at a proximal end of the support portion 15 for rotatably supporting a rotary cam 16' for driving the yoke 14'.

The yoke 14' defines an engaging recess 14'A in a side surface thereof opposed to the mounting seat 2A. The support portion 15 is fitted into the engaging recess 14'A. The support portion 15 has a shape of an approximately half tube defining a semihexagonal outer surface. The yoke 14' is tight fitted on this support portion 15 not to be rotatable about the axis of the spool shaft 10.

As shown in FIG. 8, the yoke 14' and rotary cam 16 define, on opposed side surfaces thereof, a cam mechanism including cam projections 16'A on the rotary cam 16' and ramps 14'B on the yoke 14'. Through this cam mechanism, rotation of the rotary cam 16' about the axis of the spool shaft 10 causes the yoke 14' to slide axially of the spool shaft 10. Urging springs 17 act on the side surface of the yoke 14' remote from the rotary cam 16', to urge the yoke 14' to a position to engage the clutch mechanism C. The yoke 14' is forcibly moved by action of the cam mechanism to a position to disengage the clutch mechanism C.

In the above construction, the support portion 15 is closer than the cam projections 16'A of the rotary cam 16' to the axis of the spool shaft 10. Thus, the yoke 14' may have a reduced outside diameter with the engaging recess 14'A disposed close to the axis of the spool shaft 10.

Figure 7:
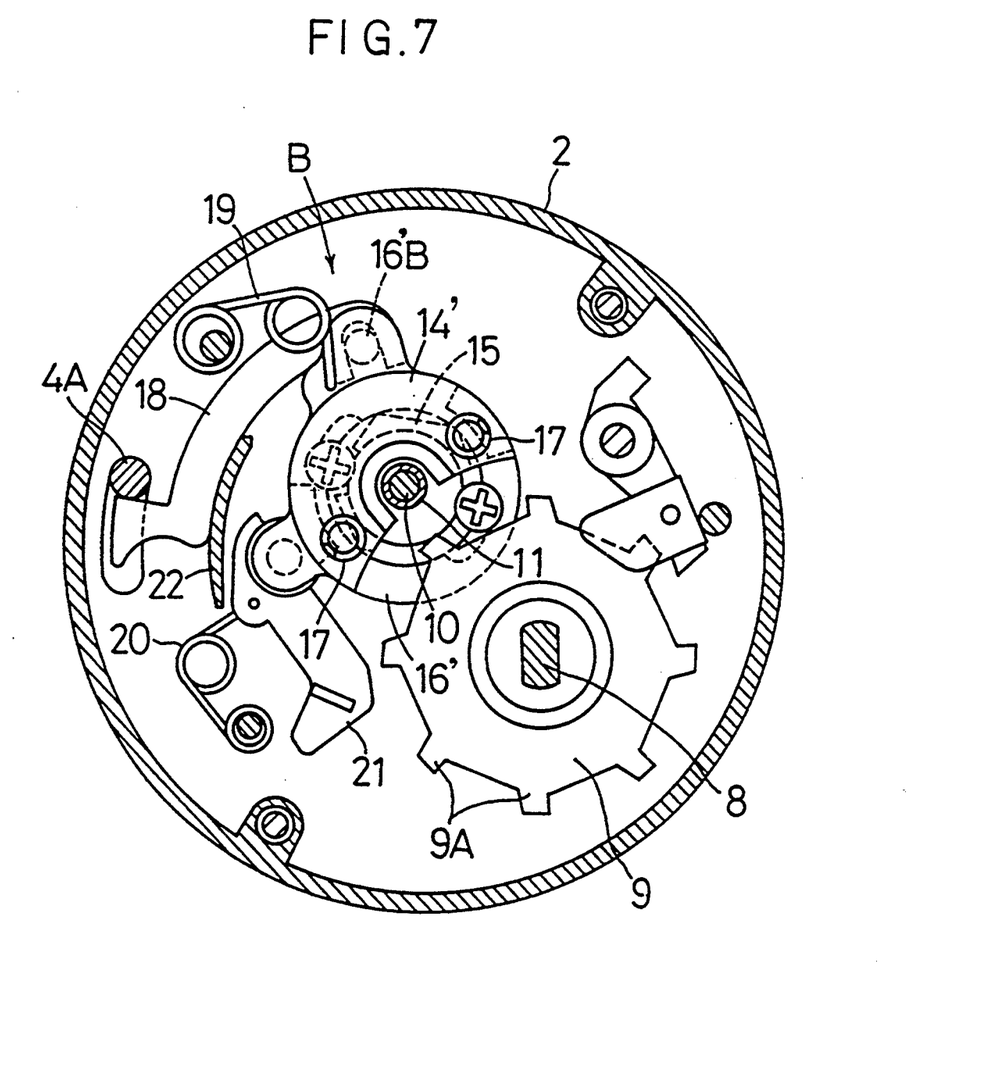
FIG. 7 is a side view in vertical section of the right case shown in FIG. 6.

An interlocking structure between the clutch controller 4 and rotary cam 16' will be described next. As shown in FIG. 7, the rotary cam 16' has an engaging pin 16'B engaged with a link element 18 operable through contact with a control pin 4A of the clutch controller 4. A toggle spring 19 acts on the rotary cam 16' to maintain the rotary cam 16 in a position to engage or a position to disengage the clutch mechanism C. A further toggle spring 20 acts on a return arm 21 to switch the arm 21 to a position in which an end thereof interferes with the ratchet wheel 9 when the clutch mechanism C is set to the disengaged position.

When disengaging the clutch mechanism C, the clutch controller 4 is depressed to place the link element 18 into contact with a guide 22. Then the link element 18 moves describing an arcuate locus while in contact with the guide 22, to rotate the rotary cam 16. As a result, the clutch sleeve 11, under pressure of the cam projections 16'A, disengages from the pin 12 fixed to the spool shaft 10.

When engaging the clutch mechanism C, the handle 5 is turned in a direction to take up the fishing line. This causes a tooth 9A of the ratchet wheel 9 to push the return arm 21, whereby the rotary cam 16 is returned. Consequently, the yoke 14' moves the urging force of springs 17 to the position to engage the clutch mechanism C.

The rotary cam 16', link element 18 and clutch controller 4 constitute a drive mechanism B for operating the yoke 14'.

Figure 10:
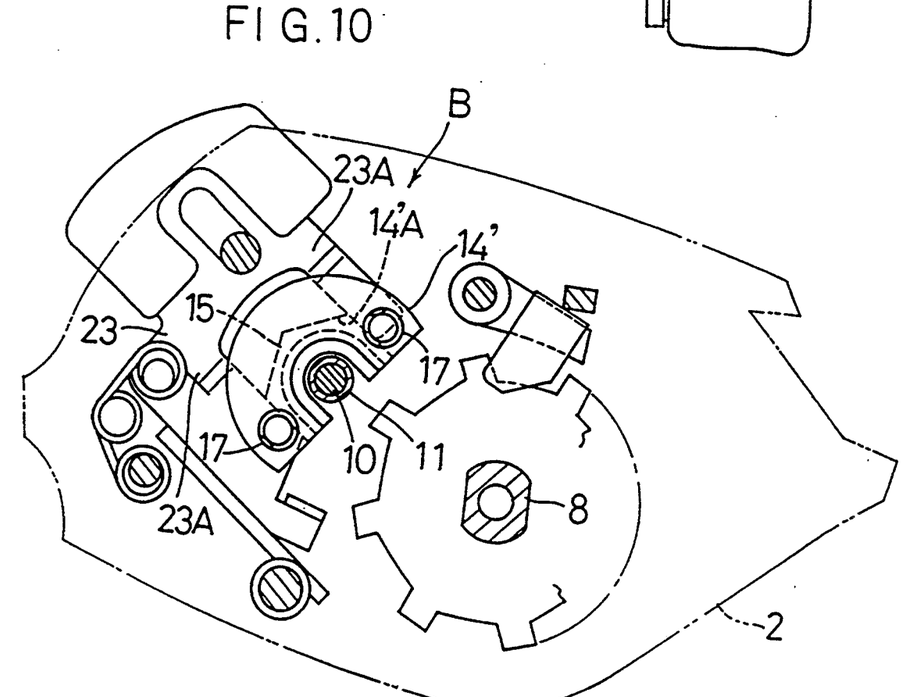
FIG. 10 is a side view in vertical section showing a clutch yoke in a still further embodiment.

This embodiment may be modified as follows:

(1) As shown in FIG. 10, a slide cam 23 may be substituted for the rotary cam 16'. In this case, the slide cam 23 includes cam surfaces 23A for sliding the yoke 14'. The yoke 14' may have a plain flat surface without the ramps for engaging the cam surfaces 23A.

(2) The support portion 15 may be provided on the yoke 14', with the engaging recess 14'A formed in the inner wall of the right case 2 for receiving the support portion 15.

(3) An actuator may be employed as the drive mechanism B.

What is claimed is:

1. A clutch structure for a fishing reel comprising:
    a spool;
    a handle;
    a transmission shaft for transmitting drive from said handle to said spool;
    a clutch member mounted on said transmission shaft to be movable axially thereof between an operative position to rotatably engage said transmission shaft for unitary rotation therewith and an inoperative position to rotate relative to said transmission shaft;
    a yoke for engaging said clutch member;
    a cam operable through said yoke to switch said clutch member between said operative position and said inoperative position;
    a raised annular support portion formed integral with a reel body for rotatably supporting said cam, said support portion projecting away from said spool, said cam being disposed to surround said support portion; and
    a smoothing support member disposed between said support portion and said cam, said smoothing support member being formed of an annular material fitted on said support portion.

2. A clutch structure as claimed in claim 1, wherein said clutch member includes a clutch sleeve slidably mounted on said transmission shaft, said clutch sleeve being engageable with a pin fixed to said transmission shaft to form a clutch mechanism.

* * * * *